United States Patent [19]

Wilhelm, Jr.

[11] 3,995,478

[45] Dec. 7, 1976

[54] PLURAL INTERRELATED SET POINT CONTROLLER

[75] Inventor: Robert Gordon Wilhelm, Jr., Columbus, Ohio

[73] Assignee: Industrial Nucleonics Corporation, Columbus, Ohio

[22] Filed: June 9, 1972

[21] Appl. No.: 261,442

[52] U.S. Cl. .............................. 73/150 R; 118/8; 235/151.3
[51] Int. Cl.² .......................................... G01B 3/00
[58] Field of Search ............... 73/150; 235/151.13, 235/151.3, 151.35, 150.1, 151.1; 118/8

[56] References Cited

UNITED STATES PATENTS

| | | | |
|---|---|---|---|
| 3,515,860 | 6/1970 | Fitzgerald | 235/151.3 |
| 3,622,448 | 11/1971 | Adams et al. | 235/151.35 |

*Primary Examiner*—Donald O. Woodiel
*Attorney, Agent, or Firm*—C. Henry Peterson; William T. Fryer, III; Allan M. Lowe

[57] ABSTRACT

Set points for thicknesses of coatings on opposite sides of a sheet are determined in response to measurements of the thickness of each coating. A computer responds to the two thickness measurements to derive indications of the spread of values of the measurements for each coating. The computer derives an additional indication of the spread of values for the total thickness of the two coatings. In response to the indications of the spreads of values for the coatings and the total coating thickness, minimum allowable average values for the two coating thicknesses and the total coating thicknesses are determined. The set point values for the two coating thicknesses are calculated from these minimum values, with consideration given to predetermined maximum and minimum ratios of the two coating thicknesses.

22 Claims, 7 Drawing Figures

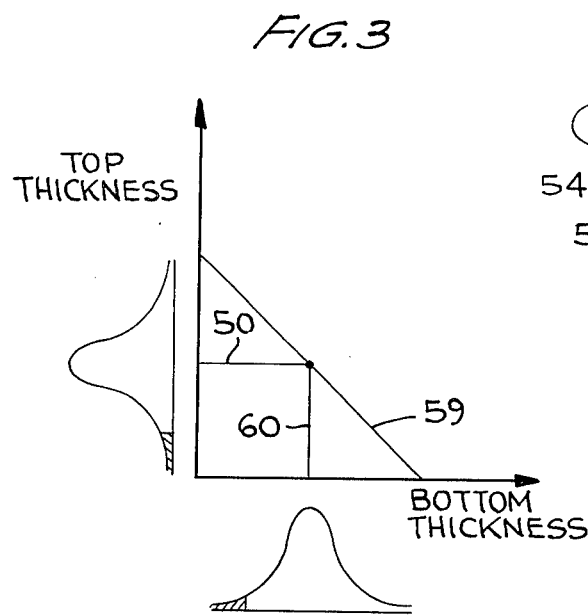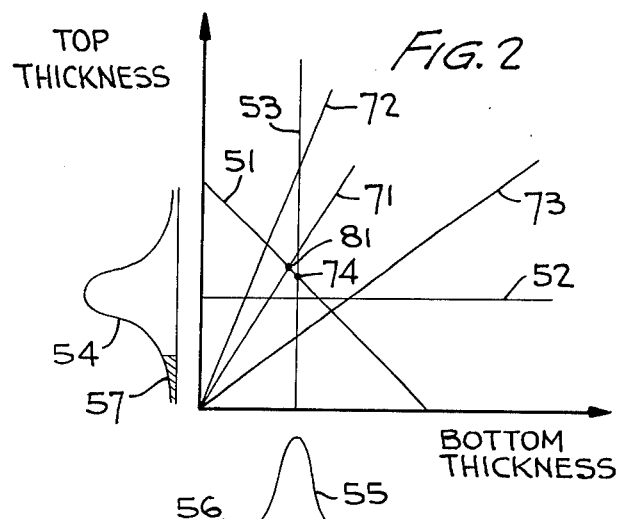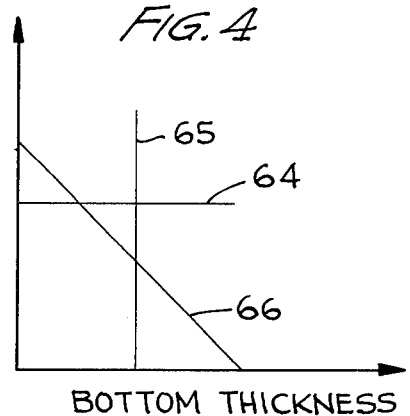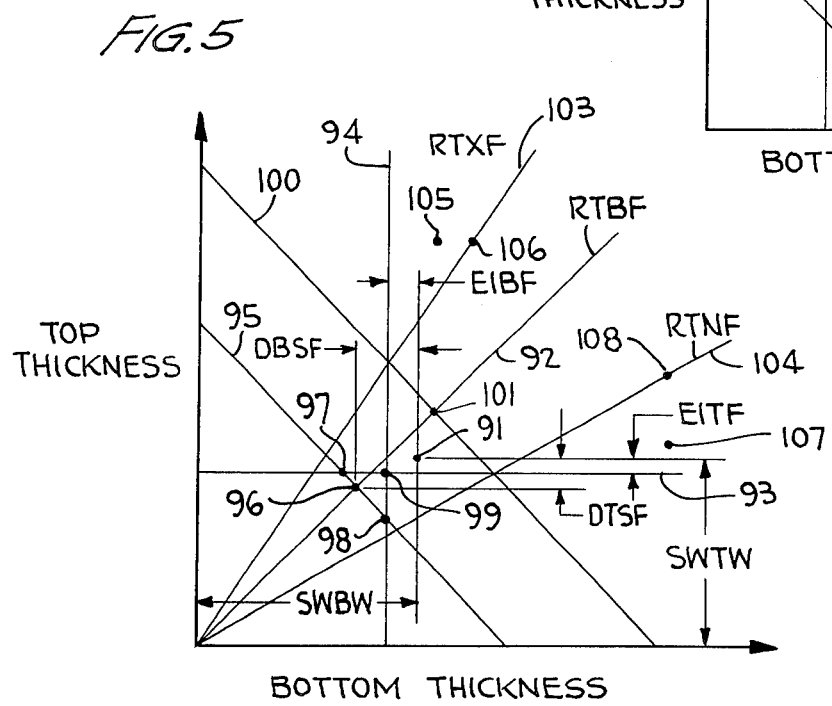

PLURAL INTERRELATED SET POINT CONTROLLER

FIELD OF THE INVENTION

The present invention relates generally to systems for and methods of controlling set points for properties of a product being processed and more particularly, to controlling set points for plural, interrelated properties in response to indications of the spreads of values for the individual and combined property values.

BACKGROUND OF THE INVENTION

Techniques for controlling the set point of a property of a material being formed in response to an indication of a spread of the property values are known; see U.S. Pat. Nos. 3,515,860, Fitzgerald Jr., and 3,622,448, Adams et al, 3,648,035, Hart et al, and the copending application, commonly assigned with the present application, of David A. Spitz, Ser. No. 189,252, filed Oct. 14, 1971.

In systems of this type, the spread of values of the property is indicated in response to computation of the standard deviation of the property or the percent of the property which is considered defective; i.e., the percent of the property having a value outside of a limit value. By controlling the set point of the property in response to the spread of values, the average value of the property is adjusted so that the amount of raw material used to form the finished product is minimized.

The prior art techniques dealt with finished products wherein the properties were independent and did not interact with each other. Hence, controlling the set point of one property could be performed independently of control for the set point of another property, even though the two properties were on the same finished product. For example, in the Adams et al patent, moisture and bone dry basis weight set points of a paper sheet being manufactured are controlled to reduce the amount of fiber required to form the sheet by minimizing the bone dry basis weight set point and maximizing moisture to produce a sheet having certain percentages of excessively low (defective) bone dry basis weight and excessively high (defective) moisture. The moisture and bone dry basis weight set points are controlled completely independently of each other.

BRIEF DESCRIPTION OF THE INVENTION

In accordance with the present invention, set point values for interrelated properties controlling the formation of a product are controlled in a manner to minimize the cost of material required to form the product. One example of such a process is coating opposite sides of a sheet, such as is performed in galvanizing. In the galvanizing process, it is desired to minimize the total amount of material applied to the two sides of the sheet, while keeping the fraction defective of the material applied to each side within a certain percentage.

In accordance with the invention, there are calculated the spread of values for the combined properties, as well as the spread values for each of the individual properties. From the indications of the spreads of values, limiting criteria are established for the combined and individual properties. Typically, the limiting criteria are equal to means points on the standard distribution curves of the several functions relating spread of values to property values. From the criteria established in response to the spread of values indication, set points for each of the properties are determined.

In the particular example of a two-sided coating process, the coating thickness of each side is measured. In response to the two measurements, indications of the spread of thickness values for each of the sides, as well as the total for both sides, are calculated. From these spread values, "desired" mean or average values for the coating thickness of each side and the total coating thickness for both sides are determined. From the desired total thickness mean value, a criterion is established for the relationship between the relative thicknesses of the two coatings. The desired mean coating thicknesses for the individual sides establish two additional criteria. From these three criteria, the coating thickness is determined.

In the specific example of a coating facility, additional criteria can optionally be employed to establish the set points for the two coating thicknesses. One criterion, which can be considered as a "soft" criterion that need not be rigidly followed, relates to the relative desired thickness of each coating i.e., the desired ratio of the thicknesses of the coatings. Additional criteria relate to the maximum and minimum ratios of the coating thicknesses of the two sides.

It is, accordingly, an object of the present invention to provide a new and improved system for and method of controlling set points of a plurality of interrelated properties of a product.

Another object of the invention is to provide a system for and method of controlling set points for interrelated properties of a product in such a manner that utilized to form the product is minimized subject to product quality constraints.

A further object of the invention is to provide a system for and method of controlling set point values for thicknesses of coatings applied to opposite sides of a sheet so that the amount of material applied to the sheet is minimized.

A further object of the invention is to provide a system for and method of controlling set point values for thicknesses of coatings applied to opposite sides of a sheet so that the cost of materials used to form the sheet is minimized.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIGS. 2–5 are diagrams helpful in describing the operation of the system of FIG. 1 under differing circumstances, and FIGS. 6A and 6B, together, are a flow chart of a program solved by a digital computer utilized in FIG. 1.

DETAILED DESCRIPTION OF THE DRAWING

Figure 1:
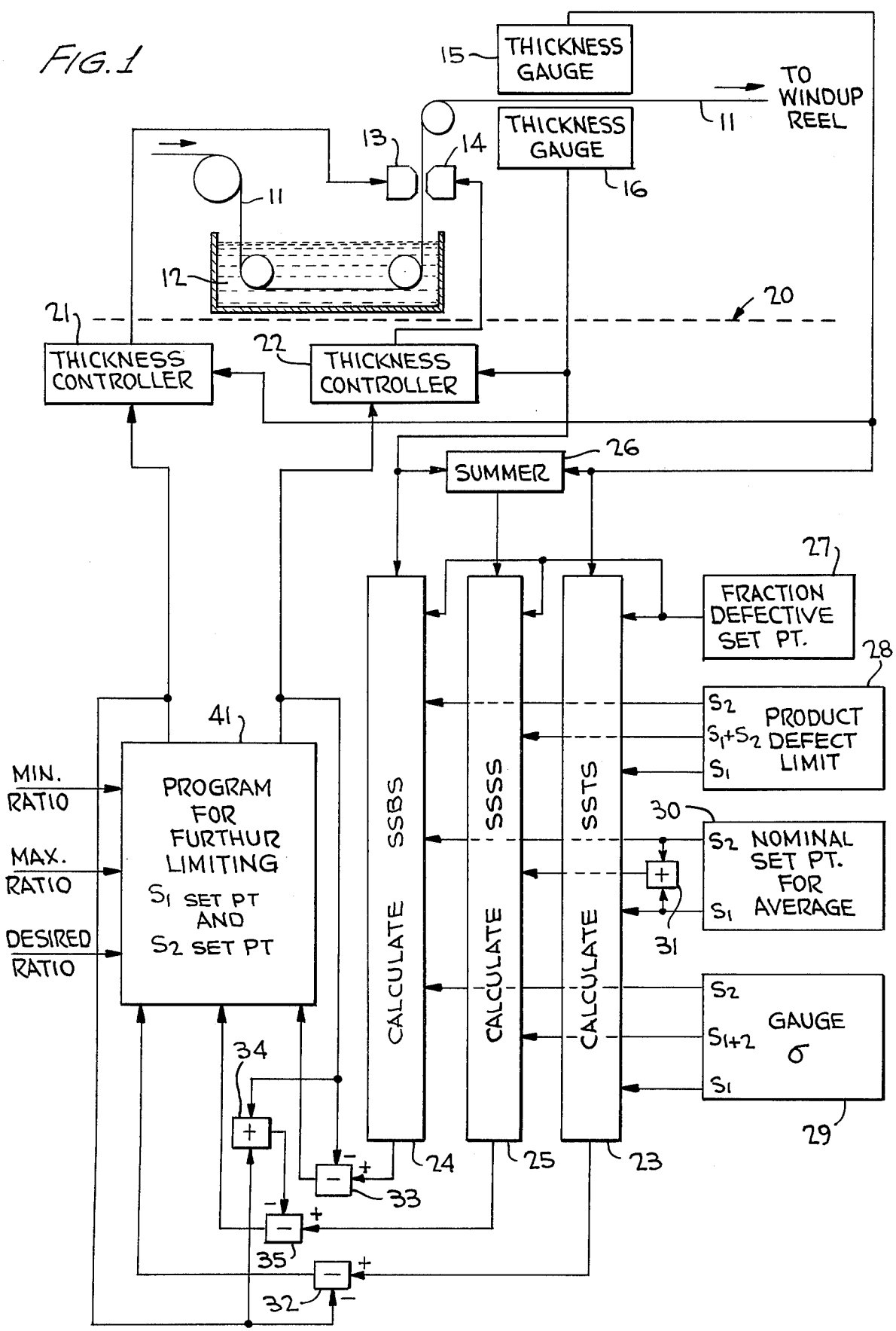
FIG. 1 is a schematic view of the invention as applied to a coating line.

Reference is now made to FIG. 1 of the drawing wherein there is schematically illustrated a system for coating, by galvanizing, opposite sides (referred to herein as the top and bottom sides) of a travelling steel sheet 11. Sheet 11 is fed from appropriate, well known preprocessing apparatus to a zinc plating bath 12 where both sides thereof are coated. Upon emerging from plating bath 12, sheet 11 passes between knives 13 and 14 which are respectively positioned adjacent its top and bottom side to control the thickness (and therefore weight) of the coatings on the sheet. The positions and pressures of knives 13 and 14 relative to the top and bottom sides of sheet 11 control the thicknesses of the two coatings, in a manner known to those skilled in the art.

After moving past knives 13 and 14, sheet 11 passes between thickness gauges 15 and 16 which respectively monitor the top and bottom coating thicknesses. Thickness gauges 15 and 16 are preferably penetrating radiation gauges that are cyclically scanned between the edges of moving sheet 11. To simplify the description, however, it is assumed that gauges 15 and 16 are stationary relative to the edges of sheet 11.

Output signals of gauges 15 and 16, indicative of the coating thicknesses of the top and bottom sides are applied to a computer means 20 which is preferably a general purpose, appropriately programmed digital computer, including the usual elements of a memory, arithmetic unit, input unit, output unit and transfer busses. To simplify the description, some of the program steps of computer 20 are considered as discrete computer elements. Operations performed by these elements are of a type described elsewhere in the art, or herein, as required. Broadly, it is the function of computer 20 to periodically derive signals having values for the set points for the top and bottom coating thicknesses. These set point signals are determined at a relatively low frequency; for example, once after every scan of gauges 15 and 16 between the edges of sheet 11 (typically between 1 and 2 minutes are required to scan gauges 15 and 16 between the sheet edges). The set point signals are determined in such a manner as to minimize the amount of zinc coating material added to sheet 11 in response to indications of the standard deviation of the variations of the coating thicknesses of the opposite sheet sides, as well as criteria stored in the computer 20. Since the amount of material on each side of sheet 11 has an effect on the total material in the sheet coatings, the two properties of the sheet being controlled (the top and bottom coatings) are considered as interrelated.

The periodically derived top and bottom set points signals are compared in thickness controllers 21 and 22 with the outputs of thickness gauges 15 and 16 for the measured top and bottom coating thickness values. In response to error signals derived by controllers 21 and 22 from the comparison, the controllers derive signals to control the positions and pressures of knives 13 and 14 relative to the opposite sides of sheet 11. The positions and pressures of knives 13 and 14 control the removal of the zinc coating from the opposite sides of sheet 11. The removed zinc is returned to plating bath 12 to minimize the amount thereof used.

In general, the top and bottom thickness set points, and therefore the average coating thicknesses of the opposite sides of sheet 11, are determined in response to measurements of the standard deviation of the coating thickness of each side of the sheet as well as the standard deviation of the total coating thickness of the sheet; i.e., the sum of the coating thickness of the two sides. If all of the standard deviations are relatively low, indicative of a narrow spread of values about a mean value, the process is behaving properly to produce a uniform product. On the other hand, if the standard deviations are relatively large, indicative of a wide spread of thickness values, the processor is producing a relatively non-uniform sheet. If the spreads are relatively narrow, the coating thickness set points are translated toward a lower limit value while the set point values must be translated away from the lower limit value if the spreads are relatively large. The reason why the coating thickness set point values should be translated in this manner is described in detail in the Fitzgerald patent referred to supra.

In the system of the present invention, the coating thicknesses on each side of sheet 11 can, and usually do, have a spread of values independent of the other side. Since, however, the total coating thickness of both sides determines how much material is used to coat the sheet, it is necessary to consider the standard deviation of the total coating thickness.

To these ends, computer 20 includes elements 23, 24, and 25 which calculate the standard deviations for the coating thicknesses of the top (SSTS) and bottom (SSBS) of sheet 11, as well as for the total coating thickness (SSSS) of the sheet. In response to the three calculated standard deviations, elements 23, 24 and 25 calculate minimum allowable values for the top, bottom and total thickness set points. To these ends, elements 23 and 24 respectively respond to the output signals of thickness gauges 15 and 16, while element 25 is responsive to an output of summing element 26 which sums the thickness signals derived from gauges 15 and 16. The calculation of standard deviation by each of elements 23–25 can be performed in accordance with the well known equation:

$$\sigma = \sqrt{\frac{1}{T} \int_0^T [f(t) - \overline{f(t)}]^2 \, dt} \qquad (1)$$

where:
$\sigma$ = standard deviation;
T = time interval over which calculation of $\sigma$ performed, e.g., 10 gauge scans;
$f(t)$ = instantaneous input; and
$\overline{f(t)}$ = average value of $f(t)$ over T.

From the values of standard deviation as determined from Equation 1, the minimum allowable set point signals derived by elements 23–25 can be determined in the manner described in the Fitzgerald patent mentioned supra. The set point values can also be determined in response to a calculation of fraction defective, as taught in the Adams et al patent, or by using other known techniques responsive to a spread of property values.

It is preferable, however, to calculate the minimum allowable set point values of elements 23–25 in the manner described in the previously mentioned Spitz application, wherein standard deviation is calculated from an algebraic approximation. To these ends, each of elements 23–25 is responsive to signals derived from sources 27 and 28 indicative of operator set values for fraction defective set point and product defective limit set point, respectively. The product defect limits are set by the operator to minimum coating thicknesses for the two sides of sheet 11 and for the total thickness. If the coating thickness is less than the limit, the sheet is considered to be nominally defective in this particular area. The product defect limit for the opposite sides of the sheet can be the same, or different, as indicated by the outputs of product defect limit set point signal source 28.

To enable the sheet to be most economically manufactured, a certain amount of nominally defective sheet should be made because of tradeoffs between customer satisfaction and material cost. Fraction defective set point signal source 27 feeds into elements 23–25 the amount of nominally defective material which the operator is willing to accept. Since this fraction is frequently the same for each side and the total coating thickness, the same signal magnitude is fed from source 27 to each of elements 23–25; it is to be understood, however that a different value of fraction defective can be supplied to each of elements 23–25.

Usually, the operator sets a nominal average set point or target value for the coating thicknesses of the two sides with signal source 30. The nominal average set point signals for the two sides, which may be the same or different from each other, are combined in adder element 31 which feeds an indication of total thickness nominal set point to element 25.

A further input to elements 23–25 is an indication of the standard deviation of the amount of noise superimposed by the gauges on the signal, as taught in the Spitz application. To these ends, computer 20 stores signals indicative of the standard deviation of the outputs of gauges 15 and 16 while the gauges were detecting the same region of a stationary sheet for a time interval prior to actual utilization. The standard deviations for gauges 15 and 16 are calculated in accordance with Equation (1) and fed to elements 23 and 24 by element 29. The standard deviation fed to element 25, however, is calculated by adding the responses of gauges 15 and 16 while they were detecting the stationary sheet and then utilizing this sum in Equation (1). After the minimum set point values for the upper and lower coating thicknesses have been calculated, the set point values supplied to controllers 21 and 22 during the immediately preceeding cycle are subtracted from them in elements 32 and 33. The resulting difference signals are supplied as inputs to program element 41. The total coating thickness set point for the preceeding cycle is determined by adding the set point signals supplied to controllers 21 and 22 in element 34. The resulting sum signal is subtracted in element 35 from the minimum total thickness set point output of element 25 to derive a signal indicative of the allowable shift in total thickness set point that is fed to element 41. These deviation values derived from elements 32–35 are combined in element 41 with certain other operator inputs. The additional operator inputs are not required for controlling the set point signals as functions on the top, bottom and total standard deviations, but assist in controlling the coating thicknesses in a manner which the operator may desire. The additional operator inputs are minimum top-to-bottom ratio of the coating thicknesses, maximum top-to-bottom ratio of the coating thicknesses, and desired top-to-bottom ratio of coating thicknesses. Program 41 responds to these operator inputs, the outputs of elements 23–25, and the set points computed during the immediately preceeding set point calculation cycle to compute the set point signals for the thicknesses of the coatings on the opposite sides of the sheet.

In FIG. 2, there are plotted straight lines on a Cartesian coordinate basis of the top coating thickness versus the bottom coating thickness. From the minimum allowable total weight set point signal computed by element 25, a straight line 51 is drawn on the graph of FIG. 2 representing the locus of points for which the sum of the set points for the top and bottom coating thicknesses equals the minimum allowable total coating thickness. Lines 52 and 53 represent the minimum allowable thicknesses for the top and bottom coatings as determined by elements 23 and 24. Lines 52 and 53 intersect mean values on normal distribution curves 54 and 55, respectively, which represent the spread of values for the thickness of the top and bottom coatings of the sheet. The spread of values indicated by curve 55 is considerably narrower than the spread represented by curve 54 whereby the mean or average value of curve 55, along line 53, is closer to the origin of the coordiante system than the average value of curve 54, along line 52. The average value of curve 55 is less than the average value of curve 54 because the low average value enables the computed fraction defective of curve 55 (indicated by cross-hatched region 56) to equal a desired fraction defective set point, as described in the Adams et al patent and the Spitz application. Because the spread of values for curve 54 is greater than that for curve 55, the average value of curve 55 has a larger magnitude to achieve the desired or set point fraction defective (indicated by cross-hatched area 57).

Lines 51–53 respectively define limit values for the thickness set points of the total, top and bottom coatings. The total thickness set point cannot go to the left and below line 51 without exceeding the fraction defective criterion for the total coating thickness. The top coating thickness set point cannot be less than line 52 without exceeding the fraction defective criterion for the top coating thickness, and the bottom coating thickness set point cannot be to the left of line 53 without exceeding the fraction defective criterion for the bottom coating thickness. Hence, the permissible range of coating thickness lies in the region above and to the right of the area bounded by the horizontal line 52, diagonal line 51, and vertical line 53. If the set points lie outside of this region, at least one of the three fraction defective set points (for the coating thicknesses of the top and bottom coatings and the total coating thickness) will be exceeded and an excessive amount of nominally defective material will be produced. The least amount of material to coat two sides and still remain within the three fraction defective criteria established by the top, bottom, and total set point limits is used when the set points are anywhere along line 51 in the region between lines 52 and 53. If the operator establishes an additional criterion, such as a desired ratio between the thicknesses of the top and bottom coatings, a definite point along line 51 can be established. It is not necessary, however, to establish one specific operating point along line 51 by resort to an additional criterion. Any point along line 51 between lines 52 and 53 results in minimizing the thickness and, therefore, weight of the total material coated on sheet 11.

While the diagram of FIG. 2 illustrates a typical set of conditions of the system of FIG. 1, there are two additional sets of conditions which will be encountered less frequently than the set of conditions indicated by FIG. 2. These sets of conditions are illustrated by FIGS. 3 and 4.

In FIG. 3, there is one and only one possible operating point since the minimum limits (indicated by lines 50 and 60) for the set points of the top and bottom coatings coincide at point 58 lying along line 59 representing the sum of the weights for the top and bottom coatings. If the situation indicated by FIG. 3 occurs, the values for the top and bottom set points supplied by program 41 to thickness controllers 21 and 22 are equal to the minimum values derived from elements 23 and 24. While it might appear that operation in accordance with the events indicated by FIG. 3 is most desirable because it results in the very minimum amount of material being coated on both sides of the sheet, such operation is not particularly desirable because, in many instances, it is too likely to result in production of a product having excessive fraction defective. Excessive fraction defective may occur in such an instance because the process is operating right at its three defect limits and any slight shift in the process might result in excessive defective material.

A further possible situation is illustrated in FIG. 4 wherein the quality constraints on the top and bottom coatings are more severely limited than those on the total coating. This situation is illustrated by the relatively high set point values derived by elements 23 and 24, as expressed by lines 64 and 65, and the relatively low value of total coating thickness set point as represented by line 66. It is noted that the intersection of lines 64 and 65 is above and to the right of line 66. Therefore, there is no point on line 66 which satisfies both criteria established by lines 64 and 65. Since it is imperative for the top and bottom minimum thickness criteria to be met, the total coating weight must exceed the minimum established by line 66. Since the closest point to line 66 in the acceptable area, bounded above line 64 and to the right of line 65 is at the intersection of line 64 and 65, the set points for thickness controllers 21 and 22 are, under these circumstances, equal to the minimum set point signals derived from elements 23 and 24.

From the foregoing, it is evident that the minimum allowable set point values derived from elements 23 and 24 are the set points fed to thickness controllers 21 and 22 for the conditions of FIG. 3 and FIG. 4, but not for the situation of FIG. 2. It is the function of program 41 to determine if the set point limit signals derived from elements 23 and 24 satisfy the criteria and to feed them to controllers 21 and 22 if the criteria are met and if the derived set points do not satisfy the criteria to modify them appropriately. Further, program 41 considers if the set point limit signals satisfy additional criteria regarding the ratio of the two coating thicknesses.

The manner in which the coating thickness ratio criteria affect the set points will be considered by again referring to FIG. 2. The three additional ratio criteria established in program 41 are represented on FIG. 2 by straight lines 71, 72 and 73 which respectively are indicative of the desired top-to-bottom coating thickness ratio, maximum top-to-bottom coating thickness ratio, and minimum top-to-bottom coating thickness ratio. Criteria 72 and 73, being maximum and minimum ratios, cannot be violated. The desired top-to-bottom ratio, however, is a "soft" constraint that need not necessarily be followed. If the soft constraint defined by line 71 falls within the region of line 51 between lines 52 and 53, the set point weights for the top and bottom coatings are determined by that point of intersection. If, however, line 71 does not intersect line 51 in the region between lines 52 and 53, the set points for the top and bottom coating thicknesses are selected as the point on line 51 closest to line 71 within said region. In the example of FIG. 2, where the intersection of line 71 with line 51 is outside of the portion of line 51 between lines 52 and 53, the set points are established at point 74, which falls at the intersection of lines 51 and 53, the closest point in the permissible region to line 71.

It is noted that the permissible region now existing in the criteria set established by FIG. 2 is the region above and to the left of line 73, above line 52, above and to the right of line 51, to the right of line 53, and below and to the right of line 72.

Prior to considering the operations performed by element 41 in response to a programm as described supra, consideration is given to nomenclature employed by reference to FIG. 5 wherein top coating thickness is plotted against bottom coating thickness. In FIG. 5, it is assumed that the system is operating at top and bottom coating thickness set points (SWTW and SWBW) indicated by point 91 and that the system has just gone through a cycle of operation whereby the set point values should be changed. The problem is to determine the location of the new set points in response to the minimum allowable values for the top, bottom and total thickness set points established by the three standard deviation calculations of elements 22–25, as well as in response to the desired thickness ratio criteria (RTBF). The desired ratio criterion is indicated by line 92, while the top, bottom, and sum thickness set point limit criteria, established by the outputs of elements 23, 24 and 25, are indicated by lines 93, 94 and 95, respectively. The separations between the present operating point 91 and the new upper and lower set point limiting lines 93 and 94 are respectively indicated by E1TF and E1BF. The separations E1TF and E1BF, therefore, represent the respective changes in top and bottom coating thicknesses required to go from point 91 to top and bottom limit lines 93 and 94. The change in total coating thickness from point 91 to minimum total coating thickness line 95 may be expressed as a value E1SF as determined by element 35 in FIG. 1. Since it is desirable to achieve both the minimum allowable total coating thickness and the desired top to bottom ratio simultaneously, we wish to resolve quantity E1SF into vertical and horizontal components defining the translation from point 91 to point 96 at the intersection of line 95 and 92. The horizontal separation between point 91 and point 96 is designated by DBSF, while the vertical separation between point 91 and point 96 is designated by DTSF. The algebraic sum of DBSF and DTSF equals E1SF, and would take on the same value regardless of the position of point 96 on line 95. it should be noted that as illustrated in FIG. 5, DBSF and DTSF are both negative quantities.

Figure 6A:
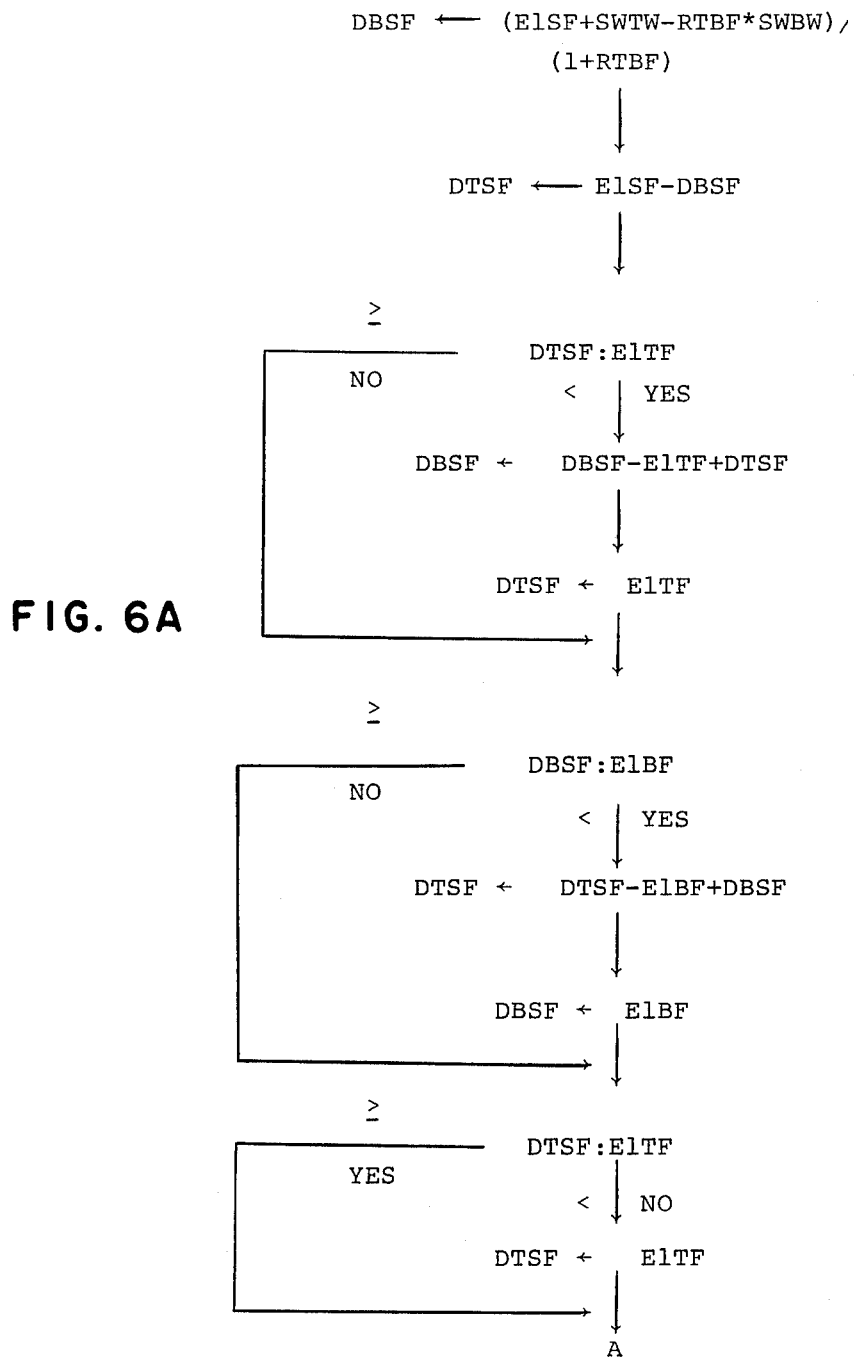
Figure 6B:
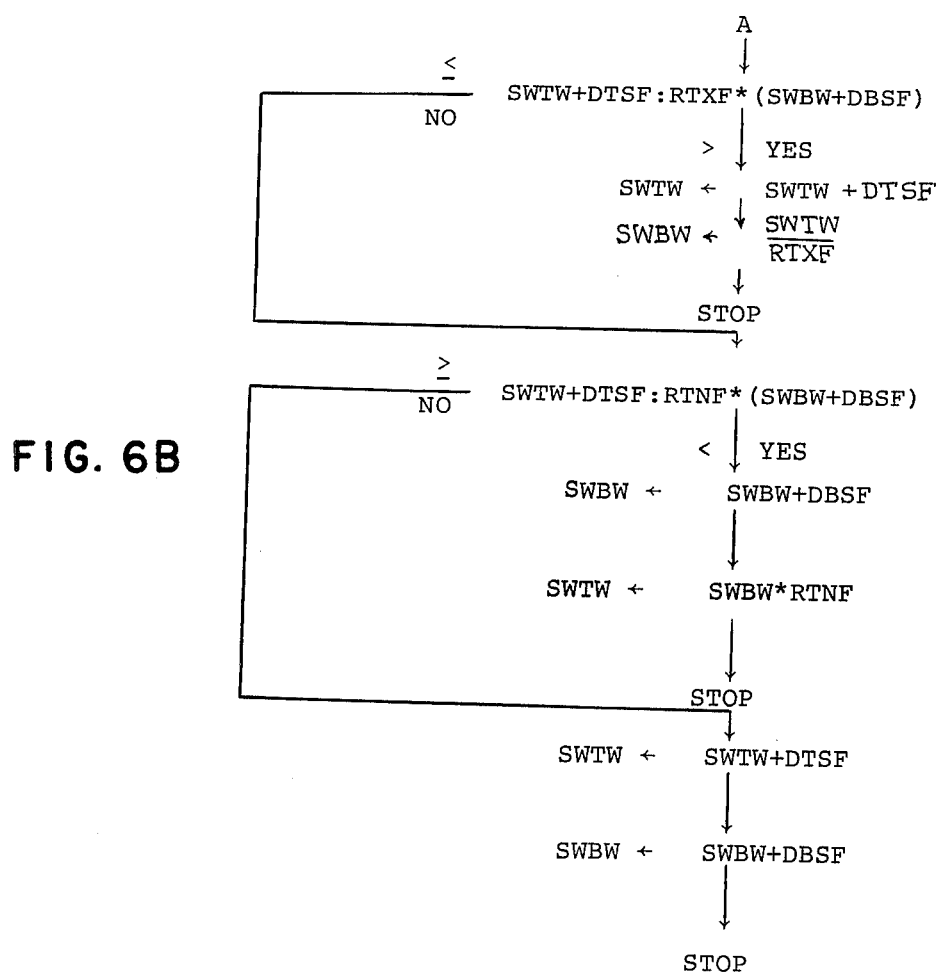

The first series of steps performed by element 41 in response to the program involves translating point 91 to point 96; i.e., calculating the values of DBSF and DTSF. A flow chart of the program operations is illustrated on FIGS. 6A and 6B, wherein conventional program notation is employed. The calculations of DTSF and DBSF are based upon the soft constraint:

$$\text{RTBF} = \frac{\text{SWTW} + \text{DTSF}}{\text{SWBW} + \text{DBSF}} \qquad (2)$$

where:
RTBF = desired ratio indicated by line 92;
SWTW = current top set point indicated by point 91; and
SWBW = current bottom set point indicated by point 91.

and the identity:

$$DTSF + DBSF \triangleq E1SF \qquad (3)$$

From Equations (2) and (3), the computer determines the values of DBSF and DTSF as:

$$DBSF \leftarrow \frac{(E1SF + SWTW - RTBF \cdot SWBW)}{1 + RTBF} \qquad (4)$$

$$DTSF \leftarrow E1SF - DBSF \qquad (5)$$

Equations (4) and (5) are written utilizing conventional computer programming notations and are solved by the computer in response to previous values for the top and bottom set points, as well as the operator desired ratio input and the shift in total thickness set point input from element 35. In response to the operation indicated by Equation (4), the computed operating position is translated from point 91 to point 96, at the intersection of desired ratio line 92 and the total thickness limit 95 determined in response to the total thickness standard deviation.

The next series of operations involves determining whether calculated point 96 lies within a permitted region above top thickness lower limit line 93 and to the right of bottom thickness lower limit line 94. The first step in this operation is to determine if point 96 is above top thickness line 93. The operation is performed by comparing the computed vertical separation between points 91 and 96 (DTSF) with the vertical distance from point 91 to line 93 (E1TF), the output of element 32. In response to DTSF being less negative than E1TF, an indication is provided that point 96 is within the permitted region and the program is stepped to the next series of operations, determining if point 96 is to the right of bottom limit line 94. If, however, point 96 is below top thickness limit line 93, as illustrated in FIG. 5 and determined by the comparison of DTSF being more negative than E1TF, new set point values, at point 97, are determined.

The new set point values are selected so that the top thickness limit line 93 is not exceeded, while retaining the criterion regarding total weight established by line 95. To calculate the shift in the bottom set point required to maintain the total thickness criterion, the previously computed lower thickness set point shift DBSF, as determined by Equation (4), is modified by the value of DTSF indicated by Equation (5) and the value of the E1TF separating point 91 from line 93. In computer program notation, the bottom weight set point shift is formulated as:

$$DBSF \leftarrow DBSF - E1TF + DTSF \qquad (6)$$

Equation (6) represents the separation of bottom coating thickness between points 91 and 97. After Equation (6) has been calculated, the computer sets the value of DTSF = E1TF so that point 91 is translated downwardly to line 93. Thereby, the magnitude of DTSF computed from Equation (5) is decreased to enable the criterion regarding top coating thickness to be achieved.

The next series of operations involves determining whether point 97 represents a bottom coating thickness greater or less than line 94. If point 97 has a value equal to or greater than the bottom thickness value indicated by line 94, the bottom weight set point value is not changed and the program is advanced to the next series of steps wherein the computed top thickness limit value is again compared with the limit value 93. If, however, the bottom thickness limit value is less than the value indicated by line 94, point 97 is translated along line 95 so that the criterion involving the sum of the set points for the top and bottom coating thicknesses is maintained and the bottom set point is set at a value coincident with line 94. To these ends, the shift in bottom set point, DBSF as determined by Equation (4) or Equation (6) (whichever one was most recently utilized to determine DBSF), is compared with E1BF, the output of element 33. In response to DBSF being greater than E1BF, as illustrated in FIG. 5, point 97 is shifted to point 98. To determine the top coating thickness shift required to translate point 97 to point 98 along line 95, the previously determined top coating thickness shift, DTSF, is modified by the difference between the presently computed values of DBSF and E1BF; i.e., the separation between points 91 and 97 in the horizontal direction. The vertical shift, DTSF, between points 91 and 98 can therefore be expressed as:

$$DTSF \leftarrow DTSF - E1BF + DBSF \qquad (7)$$

After the computer has calculated the value of DTSF in accordance with Equation (7), the shift in the bottom set point from point 91 to point 98 is set equal to the distance separating point 91 from line 94, E1BF. Thereby, point 98 is reached.

After point 98 has been reached, the program again determines whether that point has a magnitude above or below line 93, the top coating thickness limit value. This operation is performed by comparing the presently stored value of DTSF, as determined by either Equation (5) or Equation (7) (whichever one was the most recently used Equation) with the limit value for the shift of point 91 to line 93, E1TF. In response to DTSF being equal to or less negative than E1TF, the previously determined value of DTSF is stored in the computer memory. If, however, DTSF is more negative than E1TF, an indication is provided that the set point top coating thickness is less than the limit value established by line 93, and it is necessary to translate the set point value to the limit value. To this end, the value of DTSF is set equal to the limit value E1TF; whereby in the example of FIG. 5, point 98 is translated to point 99 at the intersection of top and bottom limit values 93 and 94.

It is noted that point 99 is displaced from both of lines 92 and 95 which respectively represent the soft constraint of desired thickness ratio and the stringent constraint of the total coating thickness. Point 99, however, does lie within the permissible region which is defined by the area coextensive with lines 93 and 94, above line 93, and to the right of line 94. If the spread of the thickness values was such that lines 93 and 94 remained as illustrated while sum line 95 was translated to the position illustrated by line 100, the set points for the top and bottom coating thicknesses would be translated to point 101 at the intersection of desired ratio line 92 and sum coating thickness line 100. Point 101 would be determined from Equations (4) and (5). Equations (6) and (7), involving shifts in the bottom and top coating thicknesses, would not be calculated by the computer because the computer, in comparing the values of DTSF with E1TF and DBSF and E1BF, would determine that the point 101 is within the permitted region above line 93 and to the right of line 94.

If the constraints regarding maximum and minimum ratios were not included, the set point changes calculated by the computer would now be combined with the values for set point 91 so that the values SWTW and SWBW are modified in accordance with the calculated values of DTSF and DBSF, respectively. Hence, the portion of the computer program dealing with deriving the set points in response to the spread of values for the top and bottom coating thicknesses and the sum of the two coating thicknesses has now been completed. If, however, further operations are performed, as described infra, the prior values of SWTW and SWBW are not at this time modified by the calculated DTSF and DBSF values.

Consideration will now be given to the portion of the program for determining if the calculated new set point is within the region between the maximum and minimum coating thickness ratios. Broadly, this series of operations involves determining whether point 91 is within the region bounded by maximum and minimum ratio limit lines 103 and 104, respectively. If point 91 is within the region between the limit slope lines 103 and 104, the point remains at its previously calculated value. If, however, point 91 is outside of either limit line, it is translated to intersect the limit line. Translation is along a horizontal or vertical line, depending upon whether the maximum or minimum ratio limit has been exceeded.

The first step in this sequence of operations involves determining whether the computed top and bottom thickness set point ratio exceeds the maximum ratio indicated by line 103. This determination is made by comparing the computed top set point with the product of the maximum ratio limit RTXF and the computed bottom thickness set point. In response to the computed top set point being less than the product, the program is activated to determine if the ratio of the computed set points is less than the minimum ratio defined by line 104. If, however, the result of the comparison operation indicates that the computed set points have a ratio above line 103, the computed set point is modified so that it is translated along a horizontal line into contact with line 103. To these ends, the top coating thickness set point SWTW of the preceeding cycle is added to the previously computed value of DTSF (SWTW ← SWTW + DTSF)

whereby a new value of top thickness set point SWTW that intersects line 103 is derived. The value of SWTW intersecting line 103 is divided by the maximum ratio limit RTXF, the slope of line 103, to derive the bottom coating thickness set point $$\left(\text{i.e., SWBW} \leftarrow \frac{\text{SWTW}}{\text{RTXF}}\right).$$

To consider an example, assume that the set point value was calculated to be translated from point 91 to point 105, whereby the top and bottom set point thickness shifts are respectively DTSF, and DBSF. These shifts would result in point 105 being to the left of and above limit value 103. The comparison operation would indicate that point 105 is in a forbidden region relative to line 103. The following pair of operations (SWTW ← SWTW + DTSF and $$\text{SWBW} \leftarrow \frac{\text{SWTW}}{\text{RTXF}}\bigg)$$

result in point 105 being shifted horizontally to the right into contact with line 103 at point 106. It is noted that the top thickness value of the computed set point is not changed from the calculated value, but that the bottom set point thickness is translated to a higher thickness than had been calculated to achieve the desired maximum weight ratio. After point 106 has been reached, the values for top and bottom coating thicknesses as determined at point 106 are supplied by element 41 to the controllers for the top and bottom coating weight thicknesses.

If the previous comparison of the computed top and bottom set points indicated that the maximum ratio line 103 was not exceeded, the program is sequenced so that a comparison is made to ascertain if the computed thickness set points result in a thickness ratio less than a minimum desired ratio, RTNF, indicated by line 104. The comparison is made by comparing the computed top thickness set point with the product of the minimum ratio limit and the computed bottom set point. In response to the comparison indicating that the ratio is not exceeded, the computed values of bottom and top set point thicknesses are read out. If, however, the comparison indicates that the minimum top-to-bottom ratio limit criterion has been exceeded, such as by point 107 being below line 104, the set point values are found by translating point 107 vertically into contact with line 104, at point 108; whereby, the set point value for the bottom thickness is the calculated value, and the set point value for the top thickness is along line 104. These operations are performed by adding the calculated change in bottom set point value to the previous bottom thickness set point value to arrive at the new calculated bottom set point value. The new bottom set point value is then multiplied by the minimum ratio limit RTNF causing the top set point to be translated from point 107 to point 108. Thereafter, the coordinate values of the new set point are read from element 41 to the top and bottom thickness controllers.

While the program has been described particularly in conjunction with minimizing the amount of zinc added to the top and bottom sides of a steel sheet for galvanizing purposes, it is to be understood that it has other applications. Also, it may be desirable to maximize the amount of added material in situations wherein the coating material is less expensive than the stock material being coated. In such an instance, the program is modified appropriately by reversing many of the comparison criteria.

While there has been described and illustrated one specific embodiment of the invention, it will be clear that variations in the details of the embodiment specifically illustrated and described may be made without departing from the true spirit and scope of the invention as defined in the appended claims.

I claim:

1. In the method of controlling a process having controller means for controlling a plurality of parameters affecting the formation of a product in response to set point values for the parameters, the improvement comprising the steps of measuring a plurality of properties of the product respectively affecting at least one of the plural parameters, responding to the measured plural properties to determine a plurality of quantities and a further quantity respectively indicative of the spreads of each of the individual properties and a combination of the individual properties, combining all of said quantities to determine the set point values for each of the plural parameters, and supplying the set point values to the controller means for the respective parameters.

2. In the method of controlling a process having controller means for controlling a plurality of parameters affecting the formation of a product in response to set point values for the parameters, the improvement comprising the steps of measuring a plurality of properties of the product respectively affecting at least one of the plural parameters, responding to the measured plural properties to determine a plurality of quantities and a further quantity respectively indicative of the spreads of the plural properties and a combination of the plural properties, from the plural and further quantities determining ranges of set point values for the plural parameters, from the determined ranges determining the set point values, and supplying the set point values to the controller means for the respective parameters.

3. In the method of controlling a sheet process having controller means for controlling parameters related to the thicknesses of first and second coatings on opposite sides of a sheet in response to set points for the parameters, the improvement comprising the steps of measuring a property indicative of the thickness of each coating, responding to the measurements to derive first and second indications of the spread of values of the measurements for each coating and a third indication of the spread of values of both coatings, in response to the first indication deriving a first limit value for the parameter related to the first coating thickness, in response to the second indication deriving a second limit value for the parameter related to the second coating thickness, in response to the first and second limit values and the third indication deriving the set points, and supplying the set points to the controller means.

4. In an apparatus for controlling a process having controller means for controlling a plurality of parameters affecting the formation of a product in response to set point values for the respective parameters and in response to measurements of a plurality of properties of the product affecting at least one of the plural parameters comprising means responsive to the measured plural properties for determing a plurality of factors and a further factor respectively indicative of the spreads of each of the individual properties and a combination of the individual properties, means for combining all of said factors to determine the set point values for each of the plural parameters and for supplying the set point values to the controller means for the respective parameters.

5. Apparatus for controlling set point values for a plurality of parameters affecting the formation of a product in response to measurements of a plurality of properties of the product respectively affecting at least one of the plural parameters comprising means responsive to the measured plural properties to determine a plurality of factors and a further factor respectively indicative of the spreads of the plural properties and a combination of the plural properties, and means responsive to the plural and further factors for determining ranges of set point values for the first and second parameters, and means responsive to the determined ranges for determining the first and second set point values.

6. Apparatus for controlling set points for parameters related to the thickness of first and second coatings on opposite sides of a sheet in response to measurements of a property indicative of the thickness of each coating comprising means responsive to the measurements for deriving first and second indications of the spread of values of the measurements for each coating and a third indication of the spread of values of both coatings, means responsive to the first indication for deriving a first limit value for the first coating thickness, means responsive to the second indication for deriving a second limit value for the second coating thickness parameter, and means responsive to the first and second limit values and the third indication for deriving the set points.

7. In the method of controlling a process having controller means for controlling a plurality of individual parameters interacting together in the formation of a product in response to set point values such that each of said individual parameters and a further parameter responsive to the interacting parameters have values such that no more than a certain percentage of the product is defective, the improvement comprising deriving first signals indicative of plural measured values of plural properties of the formed product, one of said measured property values being provided for each of the parameters, deriving a second signal indicative of the further parameter, deriving set point signals for fraction defective values of each of the plural parameters and for the further parameter, responding to the first and second signals and the fraction defective set point signals to compute desired average values for each of the individual parameters and for the further parameter such that each of the individual parameters and the further parameter is at its fraction defective set point, responding to the average values to determine the individual parameter set point values such that none of the fraction defective set points are exceed and supplying the individual parameter set point values to the controller means for the respective individual parameters.

8. The method of claim 7 wherein the desired average values are computed in response to indications of the standard deviation for each individual parameter and the further parameter.

9. The method of claim 7 wherein the individual set point values are determined such that the separation thereof from the average value for the further parameter is minimized.

10. Apparatus for controlling set point values for a plurality of individual parameters interacting together in the formation of a product, said set point values being such that each of said individual parameters and a further parameter responsive to the interacting parameters have values such that no more than a certain percentage of the product is defective, comprising means for deriving first signals indicative of plural measured values of plural properties of the formed product, one of said measured property values being provided for each of the parameters, means for deriving a second signal indicative of the further parameter, means for deriving set point signals for fraction defective values of each of the plural parameters and for the further parameter, means responsive to the first and second signals and the fraction defective set point signals for computing desired average values for each of the individual parameters and for the further parameter such that each of the individual parameters and the further parameters is at its fraction defective set point, and means responsive to the average values for determining the individual parameter set point values such that none of the fraction defective set points is exceeded.

11. The apparatus of claim 10 wherein the means for computing the desired average values includes means for computing indications of the standard deviation for each individual parameter and for the further parameters.

12. The apparatus of claim 10 wherein the means for determining the individual set point values includes means for determining the values thereof such that the separation thereof from the average value for the further parameter is minimized.

13. Apparatus for controlling set points for parameters related to thicknesses of coatings on opposite sides of a sheet in response to indications related to the thicknesses of each coating and the total thickness of the coatings comprising means responsive to the indications for deriving desired average values for the set points of each coating thickness parameter and for the total coating thickness parameter such that fraction defective set points for each coating thickness parameter and the total coating thickness parameter are substantially attained, and means responsive to the average values for determining the set point values for the individual coating thickness parameters such that none of the three fraction defective set points is exceeded.

14. The apparatus of claim 13 wherein the means for determining the set point values includes means for controlling the set point values for the coating thickness parameters for the two sides such that the separation thereof from the average value for the total coating thickness parameter is minimized.

15. The apparatus of claim 15 wherein the means for determining the set point values includes means for computing preliminary thickness coating parameter values for the two sides in response to an indication of a desired relation between the thickness parameters of the top and bottom coating thicknesses and an indication of the desired average value of the total coating thickness parameter, means for comparing the preliminary thickness coating parameter values for the two sides with the derived desired values for the two coatings, and means responsive to the comparison means for selectively altering at least one of the preliminary thickness coating value parameters.

16. The apparatus of claim 15 further including second means for comparing the determined set point values with signals indicative of maximum and minimum criteria regarding the relative values of the coating thickness parameters, and means responsive to the second comparing means for selectively changing one of the determined set point values so that the criteria are satisfied.

17. Apparatus for controlling set point values for a plurality of individual parameters interacting together to control the value of a further parameter in the formation of a product, said apparatus being responsive to indications of the property values responsive to each individual parameter and the further parameter, comprising means responsive to the indications for deriving desired average values for the set points of each individual parameter and for the further parameter such that fraction defective set points for each individual parameter and the further parameter are substantially attained, and means responsive to the average values for determining set point values for the individual parameters such that none of the fraction defective set points is exceeded.

18. In the method of controlling a process having controller means for controlling parameters related to thicknesses of coatings on opposite sides of a sheet in response to set point values for the parameters and to indications of the thickness parameter of each coating and a parameter related to the total thickness of the coatings, the improvement comprising the steps of responding to the indications to derive desired average values for the set points of each coating thickness parameter and for the total coating thickness parameter such that fraction defective set points for each coating thickness parameter and the total coating thickness parameter are substantially attained, responding to the average values to determine the set point values for the individual coating thickness parameters such that none of the three fraction defective set points is exceeded, and supplying the set point values to the controller means for the respective parameters.

19. The method of claim 18 wherein the set point values for the coating thickness parameters for the two sides are such that the separation thereof from the average value for the total coating thickness parameter is minimized.

20. The method of claim 18 wherein the set point values are determined by computing preliminary thickness parameter coating values for the two sides by determining the intersection of a line indicative of a desired relation between the thickness parameters of the top and bottom coating thickness parameters and a line representing the desired average value of the total coating thickness parameter, comparing the values for the two sides at the intersection with the derived desired values for the two coatings, and altering at least one of the preliminary thickness coating values in response to the comparison indicating that either of the values at the intersection is outside of either limit established by the average values for the two sides.

21. The method of claim 20 further including the steps of determining if the determined set point values satisfy maximum and minimum criteria regarding the relative amounts of the coating thicknesses, and in response to the determined set point values not satisfying either critera changing one of the determined set point values so that the criteria are satisfied.

22. In the method of controlling a process having controller means for controlling a plurality of individual parameters interacting together to determine the value of a further parameter in the formation of a product, the improvement comprising deriving indications of property values responsive to each individual parameter and the further parameter, responding to the indications to derive desired average values for the set points of each individual parameter and for the further parameter such that fraction defective set points for each individual parameter and the further parameter are substantially attained, responding to the average values to determine set point values for the individual parameters such that none of the fraction defective set points is exceeded, and supplying the determined set point values to the controller means for the respective parameters.

* * * * *